United States Patent [19]

Londres

[11] 4,400,992
[45] Aug. 30, 1983

[54] CABLE RETAINER CLIP

[75] Inventor: Manuel P. Londres, Milwaukee, Wis.

[73] Assignee: Allis-Chalmers Corporation, Milwaukee, Wis.

[21] Appl. No.: 192,078

[22] Filed: Sep. 29, 1980

[51] Int. Cl.³ .............................................. F16C 1/10
[52] U.S. Cl. ............................. 74/501 R; 248/68 R; 248/74 R
[58] Field of Search ................... 74/501 R; 248/68 R, 248/68 CB, 74.3, 74.1

[56] References Cited
U.S. PATENT DOCUMENTS 3,384,158  5/1968  Rothenbach ...................... 248/74.3
4,073,200  2/1978  Plate et al. ......................... 74/501 R

FOREIGN PATENT DOCUMENTS 2439404  2/1976  Fed. Rep. of Germany .... 74/501 R
  65963  3/1969  German Democratic
                  Rep. ................................... 248/74.1

Primary Examiner—Kenneth Dorner
Attorney, Agent, or Firm—Arthur L. Nelson

[57] ABSTRACT

A cable retainer clip for locking a sheath of a sheathed cable on a vehicle chassis. The retainer clip fastens the cable in a slot to anchor it in a fixed position.

10 Claims, 6 Drawing Figures

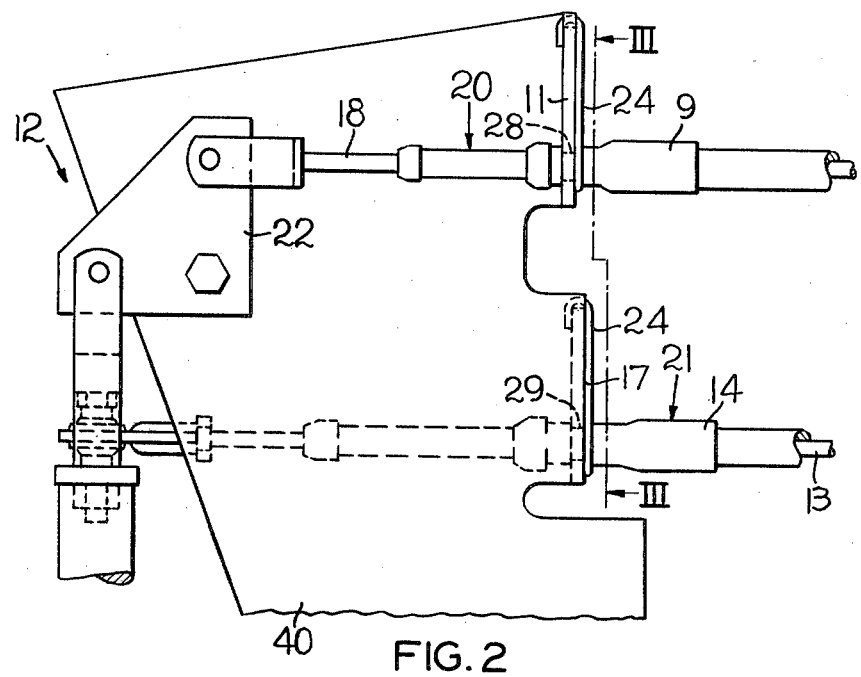
FIG. 2
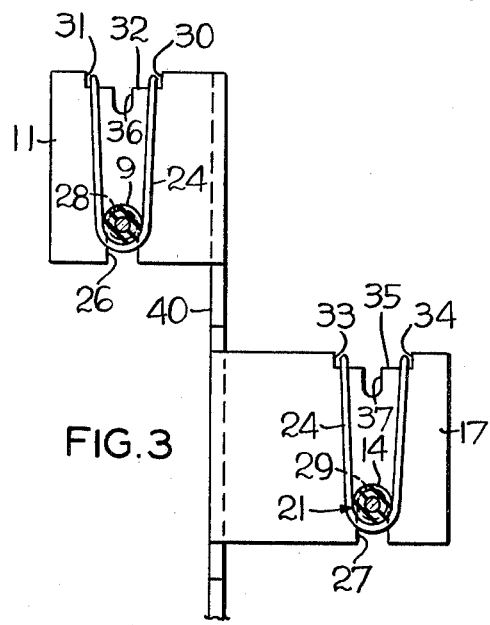
FIG. 3
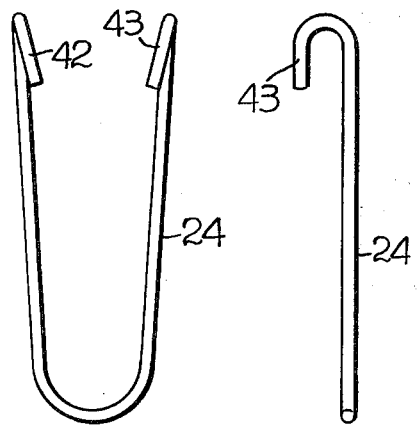
FIG. 4
FIG. 5

CABLE RETAINER CLIP

This invention relates to a cable retainer clip and more particularly to a resilient retainer clip for locking a sheath of a sheathed cable to a support.

Operation of a vehicle is usually accomplished through levers, linkages, mechanisms, or cables to control speed, direction and power of the vehicle. Conventionally these devices provide force transmission to remotely control some servo function on the vehicle. When cables are used for such operation, the sheath of the cable is generally fastened to a stationary support on the vehicle. The fastening structure may consist of a nut engaging a screw thread of the sheath of the cable which can be tightened to firmly hold the sheath of the cable in the fixed position on the vehicle chassis. The cable per se reciprocates within the sheath responsive to operative movement from the operator station to perform the desired function on the vehicle. The U.S. Pat. No. 4,073,200 illustrates a means of fastening a cable to a supporting structure. This supporting structure, however, is a trunnion mount on a pivoting lever in which the sheath of the cable operates to pivot the lever in a manner described in the patent. The fastening means of the cable shown in this patent is through a wire clip which retains a cable on the trunnion to maintain a fixed position relative to the trunnion. The applicant's invention, however, provides for mounting of the sheath of the cable on a fixed support element through a clip which holds the cable in a slot and can be readily fastened to the support structure. The clip provides a firm means of anchoring a cable on the support structure and also provides a means for readily assembling and disassembling the cable support structure.

It is an object of this invention to provide a cable retainer clip for anchoring a cable sheath on the stationary member.

It is another object of this invention to provide a cable sheath support and anchor for a sheathed cable operating a servomechanism on a vehicle.

Is a further object of this invention to provide a cable retainer clip on a cable operated control including a slotted cable support an a retainer clip to hold the cable sheath anchored on the vehicle chassis while the cable is reciprocated in the sheath to transmit a force from the operator station to the servomechanism.

The objects of this invention are accomplished by the use of a retainer clip for holding a cable in a slot to anchor the cable sheath on a vehicle chassis. The clip defines essentially a U-shape configuration having curled ends which are pressed through a notch and allowed to expand to engage shoulders of the retainer clip slot thereby retain the cable sheath in the slot. The arcuate portion of the retainer clip follows the periphery of the cable to hold the cable in the slot and anchor the cable in a fixed position.

Referring to the drawings:

FIG. 2 is a side elevation view of the transmission shifting mechanism showing the mounting of the cable sheaths on support brackets of the vehicle chassis;

FIG. 3 is a partial cross-section view taken on line III—III of FIG. 2;

FIG. 4 is a side elevation view of the retainer clip;

FIG. 5 is an end elevation view of the retainer clip shown in FIG. 4; and

Figure 1:
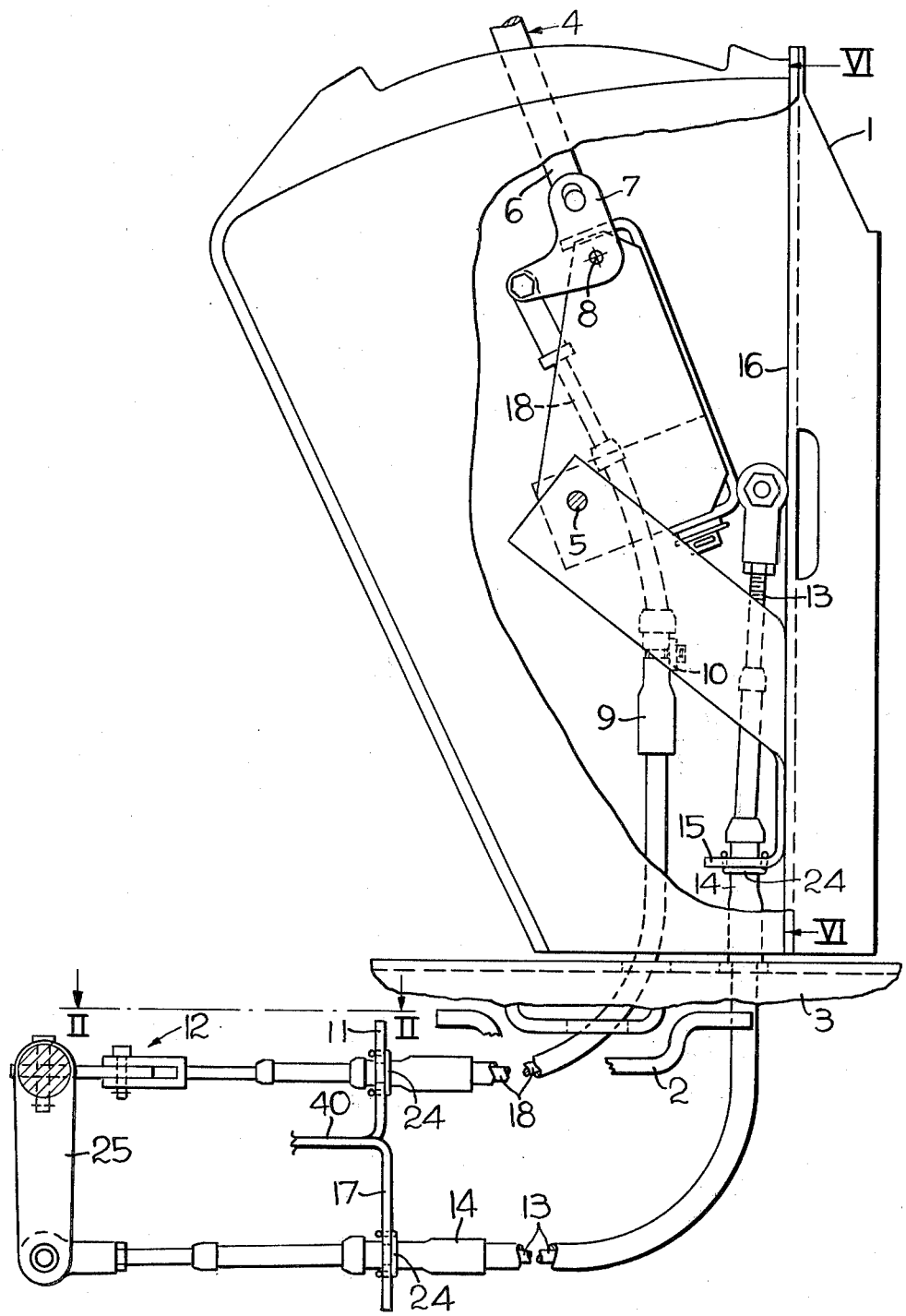
FIG. 1 shows a side elevation view of a control console partially in section to show the cables operated by a control lever and the mounting of the cable sheaths on the support brackets.
Figure 6:
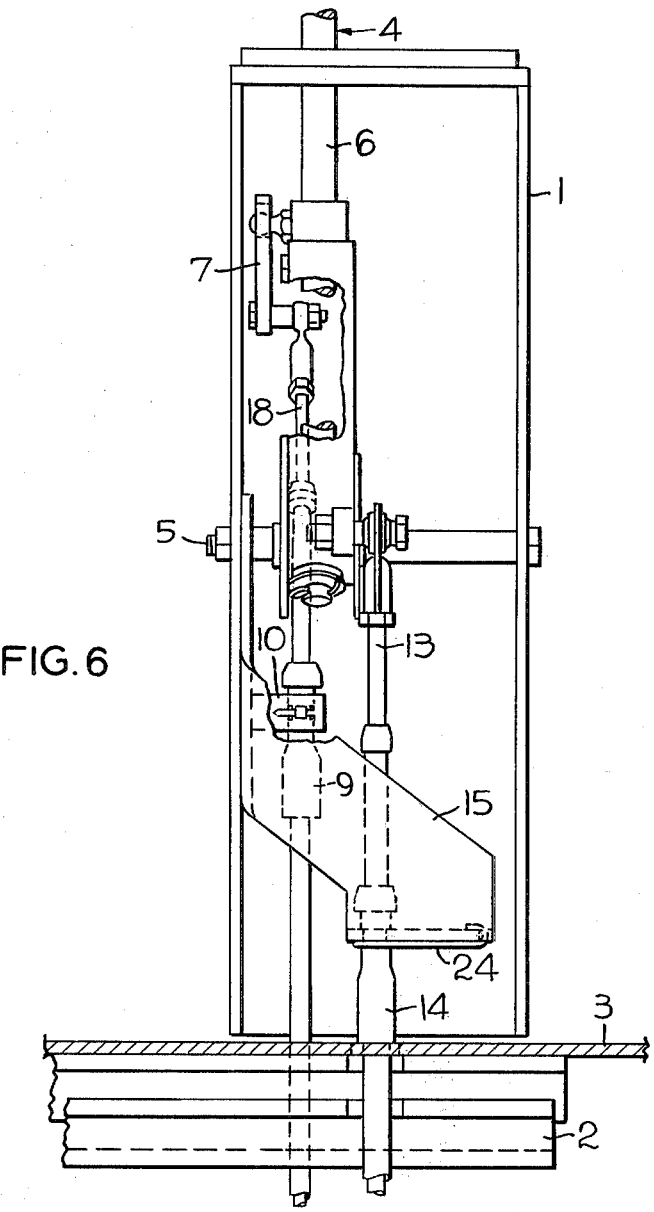
FIG. 6 is an end view of the control console shown in FIG. 1 and partially sectioned to illustrate the relationship of the components of the shift lever, cables and supporting structure.

A control console 1 is mounted on the platform 3 which is supported on the chassis 2. The shift lever 4 pivots on the pin 5 which is supported in the control console 1. The shaft 6 of the control lever 4 is rotatable upon its axis to pivot the bell crank 7 on its pivotal axis 8. Rotational movement of the shaft 6 of the control lever 4 lifts or lowers the cable 18 to reciprocate the cable within the sheath 9. The sheath 9 is mounted on the bracket 10 which is connected to the control console 1. Similarly the sheath 9 is mounted on the bracket 11 on the vehicle chassis which operates the shift mechanism 12.

Pivotal movement of the lever 4 and the lever supporting structure connected to cable 13 about the pivotal pin 5 reciprocates the cable 13 in and out of the sheath 14. The sheath 14 is supported on the bracket 15 which is carried on the wall 16 of the control console 1. The sheath 14 extends to the transmission and shifting mechanism 12 where it is mounted on the bracket 17, which is carried on the vehicle chassis. Reciprocal movement of the cable 13 to operates the shifting mechanism.

Referring to FIGS. 2, 3, 4 and 5 the transmission shifting mechanism 12 selectively engages a shift rail and reciprocates the shift rail to selectively shift gears as the shift rail is reciprocated in two directions. The sheathed cables 20 and 21 are shown providing the reciprocal force and motion to operate the bell crank 22. A sheathed cable 20 includes the sheath 9 and cable 18 which pivots the bell crank 22. The sheath 9 is mounted on a bracket 11 by means of a retainer clip 24. Similarly the cable 21 includes the sheath 14 and the cable 13 to pivot the lever 25. The sheath 14 is mounted in the bracket 17 and retained in this position by a retainer spring clip 24. Brackets 11 and 17 are integral with support 40.

FIG. 3 shows the side views of the retainer clips 24 in which the sheath 9 and sheath 14 respectively are retained in their respective cable slots 26 and 27. The cable slots have an arcuate inner end and parallel side to be received in annular recesses on the cables. Annular recess 28 is formed on the sheath 9 while an annular recess 29 is formed on the sheath 14. The retainer spring clip 24 pulls the cable into the slot when it is assembled as shown. The retainer clips are formed of the spring material which expands laterally against the shoulders 30 and 31 of slot 32. The retainer clip 24, also shown in FIG. 3, expands laterally to engage the shoulders 33 and 34 of the retainer clip slot 35.

A central notch 36 is for insertion of the retainer clip 24 when it is assembled around the sheathed cable 20. Similarly the retainer spring clip 24 when it is received around the sheathed cable 21 is to be inserted in the slot 37 when it is assembled on the bracket 17. The curled ends 42 and 43 of the retainer spring clip 24 extend through the central notch when assembled and they expand to engage shoulders along their lateral surfaces and overhang a portion of the support bracket to prevent if from disassembling from the bracket and cable.

The device operates in the following described a manner.

Referring to sheathed cable 21, an annular recess 29 is formed on the cable sheath. The annular recess has a diameter equal to the width of the slot 27. As the sheated cable 21 is inserted in the slot, the sides of the slot are received in the annular recess 29 and it is pressed upwardly until it engages the arcuate end surface of the slot. In this position the clip 24 is then placed around the cable and pressed upwardly to hold the cable sheath 14 in the slot 27. The clip 24 is then positioned in the notch 37 and allowed to expand. The curled ends 42 and 43 of the retainer clip then expand laterally and lock the cable in the assembled position. The resilience of the retainer clip maintain the clip in the expanded position and the curled ends extending over the bracket and are prevented from unfastening. Accordingly the cable 21 is locked in the position as shown. It can be disassembled by retracting the curled ends 42 and 43 from the notch 37 and withdrawing the retainer spring clip from the cable allowing the cable to be removed from its position in the slot 27.

The embodiments of the invention in which an exclusive property or privilege is claimed are defined as follows:

1. A cable retainer assembly comprising, a support member defining a cable slot, a sheathed cable having a sheath with an annular recess formed on the sheath received in the cable slot to axially lock the cable, a retainer clip extending around the cable retaining said cable in the cable slot, a retainer clip slot on the opposing side of said support member from said cable slot, a notch formed in said retainer clip slot to receive retainer clip ends for assembly of said retainer clip and thereby allow said retainer clip ends to expand against the sides of said retainer slot in the assembled position for locking said cable in the support member.

2. A cable retainer assembly as set forth in claim 1 wherein said support member defines a plate.

3. A cable retainer assembly as set forth in claim 1 wherein said retainer clip defines essentially a U-shaped configuration.

4. A cable retainer assembly as set forth in claim 1 wherein said cable slot defines an arcuate inner end and parallel sides.

5. A cable retainer assembly as set forth in claim 1 wherein said retainer clip lies essentially in a common plane and having ends curled 180° forming curled ends to lock said clip on the support member.

6. A cable retainer assembly as set forth in claim 1 including means defining said notch centrally in said retainer clip slot for insertion of curled ends of said clip for assembling of said cable retainer assembly.

7. A cable retainer assembly as set forth in claim 1 including means on said support member defining an arcuate end of said cable slot for receiving the peripheral recess of said cable sheath to thereby provide contact for 180° around the periphery of said cable sheath.

8. A cable retainer assembly as set forth in claim 1, wherein said retainer clip slot defines shoulders on the transverse sides of said slot for engaging expanded curled ends of said retainer clip in said cable retainer assembly.

9. A cable retainer assembly as set forth in claim 1, including a control console of a vehicle, a lever pivotally mounted in said control console and pivotally connected to one end of said cable to reciprocate the cable within the sheath of said sheathed cable, stationary means for supporting both ends of the sheath of said sheathed cable.

10. A cable retainer assembly as set forth in claim 1, including a vehicle chassis supporting said support member, a lever, a control console on said chassis pivotally supporting a control lever, means supporting opposite ends of the sheathed of said sheath cable on said chassis, means pivotally connecting one end of said cable with said lever to provide means for reciprocating said cable in said sheath.

* * * * *